US009719593B2

(12) United States Patent
Souply et al.

(10) Patent No.: US 9,719,593 B2
(45) Date of Patent: Aug. 1, 2017

(54) HYDRAULIC TRANSMISSION CIRCUIT (75) Inventors: Jean-Pierre Souply, Senlis (FR); Guillaume Charrier, La Croix en Touraine (FR); Gilles Lemaire, Margny les Compiegne (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 825 days.

(21) Appl. No.: 13/142,512

(22) PCT Filed: Dec. 30, 2009

(86) PCT No.: PCT/FR2009/052719
§ 371 (c)(1),
(2), (4) Date: Oct. 26, 2011

(87) PCT Pub. No.: WO2010/076542
PCT Pub. Date: Jul. 8, 2010

(65) Prior Publication Data
US 2012/0036994 A1   Feb. 16, 2012

(30) Foreign Application Priority Data
Dec. 31, 2008   (FR) ...................................... 08 59171

(51) Int. Cl.
*F15B 11/16*    (2006.01)
*F16H 61/448*  (2010.01)
(Continued)

(52) U.S. Cl.
CPC ............ *F16H 61/448* (2013.01); *B60K 6/12* (2013.01); *F03C 1/045* (2013.01); *F03C 1/0409* (2013.01);
(Continued)

(58) Field of Classification Search
CPC ...... F03C 1/2438; F16H 61/44; F16H 61/444; F16H 61/448; F16H 61/452
(Continued)

(56) References Cited

U.S. PATENT DOCUMENTS 3,458,999 A * 8/1969 Reis ............................... 60/416
4,807,519 A   2/1989 Wüsthof et al.
(Continued)

FOREIGN PATENT DOCUMENTS

DE   3027983 A1 * 2/1982 ............. F16H 39/44
EP   1 319 836 A2   6/2003
(Continued)

OTHER PUBLICATIONS

International Search Report: mailed Oct. 11, 2010; Appl. PCT/FR2009/052719.

*Primary Examiner* — Eric Keasel
*Assistant Examiner* — Matthew Wiblin
(74) *Attorney, Agent, or Firm* — Ladas & Parry LLP (57) ABSTRACT

A hydraulic transmission circuit is provided having at least two elementary hydraulic motors, each having a secondary enclosure and a main duct for fluid feed and a secondary enclosure and a main duct for fluid discharge. A fluid distributor distributes fluid from the main ducts to the elementary motors via the secondary enclosures. A control system controls the elementary motors. Valves connecting the fluid distributor to the secondary enclosures of the first motor put a secondary enclosure into communication with a main duct independent of an operating mode of any other elementary motor.

21 Claims, 8 Drawing Sheets

(51) Int. Cl.
- *B60K 6/12* (2006.01)
- *F03C 1/30* (2006.01)
- *F03C 1/40* (2006.01)
- *F03C 1/24* (2006.01)
- *F03C 1/247* (2006.01)
- *F03C 1/26* (2006.01)
- *F16H 61/4096* (2010.01)
- *F04C 14/02* (2006.01)

(52) U.S. Cl.
CPC .......... *F03C 1/247* (2013.01); *F03C 1/2438* (2013.01); *F03C 1/26* (2013.01); *F16H 61/4096* (2013.01); *F04C 14/02* (2013.01); *Y02T 10/6208* (2013.01)

(58) Field of Classification Search
USPC ...................................... 60/425; 91/519, 530
See application file for complete search history.

(56) References Cited

U.S. PATENT DOCUMENTS

| | | | |
|---|---|---|---|
| 5,836,231 A | | 11/1998 | Leinonen |
| 6,122,913 A | * | 9/2000 | Macit .............................. 60/419 |
| 2001/0003948 A1 | | 6/2001 | Uski |
| 2003/0110765 A1 | * | 6/2003 | Bailey et al. ................... 60/413 |
| 2007/0125447 A1 | * | 6/2007 | Alfthan ........................ 144/343 |
| 2008/0256939 A1 | * | 10/2008 | Lemaire et al. ............... 60/420 |
| 2009/0057049 A1 | * | 3/2009 | Yamada et al. ............... 180/307 |

FOREIGN PATENT DOCUMENTS

| | | | | |
|---|---|---|---|---|
| GB | 2 055 987 A | | 3/1981 | |
| JP | 4764922 B2 | * | 9/2011 | ............. F15B 11/02 |
| WO | WO 2008025413 A1 | * | 3/2008 | ............. F04B 49/06 |
| WO | WO 2010118816 A1 | * | 10/2010 | ............. F16H 1/444 |

\* cited by examiner

HYDRAULIC TRANSMISSION CIRCUIT

The invention relates to a hydraulic transmission circuit comprising:
- at least first and second elementary hydraulic motors that are associated for procuring a common drive, each elementary motor having two secondary enclosures, one for feed and one for discharge;
- at least two main ducts respectively for fluid feed and for fluid discharge;
- a fluid distributor for distributing the fluid from said main ducts to said elementary motors via their secondary enclosures; and
- a control system for controlling the elementary motors.

The term "elementary hydraulic motor" is used herein to mean either a hydraulic motor, or a sub-motor of a hydraulic motor, the sub-motor being a portion of the hydraulic motor that is capable, when it is fed on its own, of supplying (non-zero) drive torque to the outlet member of the motor, and of doing so regardless of the angular position of said outlet member relative to the stator structure of the motor. Preferably, the torque delivered by the sub-motor is substantially independent of the angular position of the outlet member of the motor relative to the stator structure of the motor. Therefore, a sub-motor, when it is fed on its own, is capable of delivering work similar to the work delivered by the full motor, but with speed of rotation and torque that are different from those of the full motor, the cylinder capacity of the sub-motor being different from the cylinder capacity of the full motor. The invention relates, in particular, to a circuit including elementary hydraulic motors of the type having radial pistons. In particular, such elementary motors have pistons mounted to slide in cylinders, the cylinders being disposed radially about the axis of the motor.

For example, the hydraulic transmission circuits to which the invention applies may serve to drive a vehicle in translation or to drive a tool carried by a vehicle. The elementary motors may then be distinct motors, e.g. for driving distinct wheels of the vehicle.

In the meaning of the invention, two elementary motors that are associated to procure a common drive are two elementary motors that are interconnected via mechanical means, e.g. a shaft, a belt, or gearing, or else that act on a common element to cause the same effect on said element or relative thereto. For example, the two elementary motors drive two distinct wheels of a vehicle, both of which wheels act on the same ground to cause the vehicle of which the circuit is part to advance.

Generally, the speed that is required for the motors incorporated in such transmission circuits is becoming increasingly high, in particular for enabling the vehicle to travel quickly between two sites on which it is used, or for enabling the tool to travel quickly between two working positions. The motors must therefore be capable both of generating high torque, so as to perform the functions of the vehicle or of the tool correctly under working conditions, and also of having a high output speed, for the reasons indicated above.

In order to achieve these two objectives, it would be possible to feed the elementary motors from a pump of very large size, making it possible, in particular, to deliver a high flow rate of fluid for driving the elementary motors at a high speed in a cylinder capacity that makes it possible to obtain high output torque. However, it would be extremely costly to be constrained, in that way, to over-dimension the pump and the internal combustion engine that drives the pump.

When the elementary motors are part of the same motor, it is known that a hydraulic motor can be used that has two, or indeed three distinct operating cylinder capacities. Such a motor can, for example, have a larger cylinder capacity developing high torque for enabling the vehicle or the tool driven by the motor to do work, and a smaller cylinder capacity that enables the vehicle or the tool to operate faster. The above-mentioned constraints mean that the small cylinder capacity is, in general, considerably smaller than the large cylinder capacity as the motor develops low torque in such small cylinder capacity. The smaller cylinder capacity is, in general used to enable the vehicle or the tool driven by the motor to move quickly.

However, the number of distinct cylinder capacities is, in general limited, and so it is difficult to form a hydraulic transmission circuit that has a large number of cylinder capacities and that thereby has a high degree of operating flexibility making it possible to vary the drive speeds and the drive torque in order to adapt operation of the vehicle as a function of circumstances.

A first object of the invention is to propose a hydraulic transmission circuit that is of the type presented in the introduction and that has a high degree of flexibility in use by means of the possibility of operating with multiple cylinder capacities.

This object is achieved by means of the fact that the fluid distributor has valve means connected to the two secondary enclosures of the first elementary motor, said valve means being suitable for putting each of the secondary enclosures of the first elementary motor into communication with either one of the two main ducts, independently of the other secondary enclosure. In other words, for each of the secondary enclosures of the first elementary motor, regardless of the main duct with which the other secondary enclosure is put into communication, the valve means are suitable for putting the secondary enclosure in question of the first elementary motor into communication with one of at least two main ducts of the hydraulic transmission circuit.

In this way, the first elementary motor can be put in a drive operating mode, in an opposing operating mode, or in an inactive operating mode, independently of the operating modes of the other elementary motors.

The possibilities, offered by the valve means, of putting the secondary enclosures of the first elementary motor into communication with one or the other of the main ducts make it possible to use said elementary motor in any one of the following four operating modes:
- high-pressure inactive, both enclosures being brought to the pressure of the main circuit that is at the higher pressure (for reasons of simplification, the term "pump high pressure" is used);
- low-pressure inactive, both enclosures being brought to the pressure of the main circuit that is of the lower pressure (for reasons of simplification, the term "pump low pressure" is used);
- drive, the two enclosures being respectively at the pump high pressure and at the pump low pressure, and the torque that is delivered being drive torque in a drive direction that is desired for the vehicle of which the circuit is part;
- opposing, the two enclosures being respectively at pump high pressure and at pump low pressure, and the torque delivered being torque applied in the direction opposite from the drive direction desired for the vehicle of which the circuit is part.

The structure of the circuit of the invention makes it possible for the elementary motors of the circuit to operate in at least three distinct non-zero cylinder capacities, the cylinder capacity of the circuit designating, in this example, the (algebraic) sum of the cylinder capacities of the elementary motors. If Cy11 is the cylinder capacity of the first elementary motor, and Cy12 is the combined cylinder capacity of the other elementary motors of the circuit, said cylinder capacities are equal to Cy12+Cy11, to Cy12 and to Cy12−Cy11 respectively for the drive mode, for the inactive mode, and for the opposing mode of the first elementary motor. Thus, the circuit has a relatively large number of cylinder capacities, thereby making it possible to avoid excessive dimensioning of the hydraulic fluid feed pumps or of their drive motors.

Finally, it is specified that each elementary motor from among the first elementary motor and the second elementary motor has a stator structure and an outlet member, and is capable, when it is fed on its own, of delivering non-zero drive torque to said outlet member, regardless of the angular position of said outlet member relative to the stator structure of the motor. As a result, an elementary motor cannot be arranged around a single cylinder containing a piston, and mounted to rotate relative to a cam on which the piston acts radially. An assembly arranged in that way cannot deliver non-zero drive torque regardless of its angular position.

In an embodiment of the invention, the control system includes an activation table that indicates or specifies and makes it possible to determine the operating modes of the various elementary motors as a function of a desired cylinder capacity, each operating mode being chosen from among drive, opposing, and inactive. Such an activation table may be implemented in any circuit having valve means making it possible to place various elementary motors in drive mode, opposing mode, or inactive mode. The total cylinder capacity of the circuit is obtained by adding or subtracting the respective cylinder capacities of the elementary motors in drive or opposing mode.

The purpose of the activation table can be better understood by considering, for example, a circuit including a motor with two sub-motors of respective cylinder capacities Cy11 and Cy12. The number of usable cylinder capacities of the circuit is presented by the following activation table:

| Sub-motor 1 | | | Sub-motor 2 | | | Cylinder capacity |
|---|---|---|---|---|---|---|
| SE 11 | SE 12 | | SE 21 | SE 22 | | |
| 0 | 0 | LP Inactive | 0 | 0 | LP Inactive | 0 |
| 0 | 0 | LP Inactive | 1 | 1 | HP Inactive | 0 |
| 1 | 1 | HP Inactive | 0 | 0 | LP Inactive | 0 |
| 1 | 1 | HP Inactive | 1 | 1 | HP Inactive | 0 |
| 1 | 0 | Drive | 1 | 0 | Drive | Cy11 + Cy12 |
| 1 | 0 | Drive | 0 | 0 | LP Inactive | Cy11 |
| 1 | 0 | Drive | 1 | 1 | HP Inactive | Cy11 |
| 0 | 0 | LP Inactive | 1 | 0 | Drive | Cy12 |
| 1 | 1 | HP Inactive | 1 | 0 | Drive | Cy12 |
| 1 | 0 | Drive | 0 | 1 | Opposing | Cy11 − Cy12 |
| 0 | 1 | Opposing | 0 | 1 | Opposing | −Cy11 − Cy12 |
| 0 | 1 | Opposing | 0 | 0 | LP Inactive | −Cy11 |
| 0 | 1 | Opposing | 1 | 1 | HP Inactive | −Cy11 |
| 0 | 0 | LP Inactive | 0 | 1 | Opposing | −Cy12 |
| 1 | 1 | HP Inactive | 0 | 1 | Opposing | −Cy12 |
| 0 | 1 | Opposing | 1 | 0 | Drive | −Cy11 + Cy12 | where:
the secondary enclosures of the first sub-motor and of the second sub-motor are respectively referenced SE11 & SE12 and SE21 & SE22;
"1" indicates that an enclosure is connected to the high-pressure main duct, and "0" indicates that an enclosure is connected to the low-pressure main duct;
an elementary motor is in drive mode when its first secondary enclosure is connected to the high-pressure main duct, and the second secondary enclosure is connected to the low-pressure main duct;
"LP Inactive" or "HP Inactive" indicate respectively an elementary motor having its secondary enclosures connected to the low-pressure (0) main circuit or to the high-pressure (1) main circuit.

The circuit thus has four different cylinder capacities that are reversible, and symmetrical, and a plurality of different inactivation modes. This activation table shows that each elementary motor can be placed in one or the other of the possible operating modes (drive, opposing, high-pressure (HP) inactive or low-pressure (LP) inactive), giving rise to the total cylinder capacity of the circuit in the chosen operating mode.

In addition, in the circuit of the invention, the control of the valve means is preferably chosen in such a manner as to use the various cylinder capacities of the motor to optimize the management of the motor, as a function of the desired behavior, it being possible for said behavior to be specified in particular by a speed of rotation, a consumed fluid flow rate, a delivered torque, etc. This optimization of the control is facilitated by the following different improvements:

In an embodiment, the control system is adapted for automatically effecting a plurality of cylinder capacity changes in a predefined order. For example, an operating mode that is desired for a motor (which mode is defined by a speed, a cylinder capacity, etc.) may be given as a setpoint to the control system; the control system then determines the sequence of the cylinder capacities to be implemented in order to put the motor in the desired operating mode. In particular, in an embodiment, the control system is suitable for operating the valve means in a manner such as to adjust the cylinder capacity progressively as a function at least of a speed of rotation of the motor and of a setpoint transmitted to the circuit, in particular a speed setpoint, while going through at least one intermediate cylinder capacity between the current cylinder capacity and the cylinder capacity corresponding to the required speed.

In particular, in an embodiment, the control system is suitable for automatically effecting a plurality of cylinder capacity changes in a predefined order, as a function at least of a speed of rotation of the motor and of a speed or acceleration setpoint transmitted to the control system. For example, in order to increase the speed progressively, while the required drive torque is decreasing, the control system progressively reduces the cylinder capacity of the motor by causing it to operate successively with smaller and smaller cylinder capacities. Preferably, to this end, the control system includes an ordered table of the various cylinder capacities and of the associated operating modes of the various elementary motors.

In an embodiment, the control system causes a flow rate delivered to an elementary motor and the cylinder capacity to be varied in substantially simultaneous manner, in order to keep the speed of said elementary motor constant.

Advantageously, in the above-mentioned embodiments that make it possible for cylinder capacity changes to be made automatically, the driver of the vehicle is relieved of the need to perform cylinder capacity selection operations, which are handled by the control system.

In an embodiment, in the circuit, the fluid distributor has at least two first distribution valves connected to respective ones of two secondary enclosures of the first elementary motor, each first distribution valve being suitable for putting the secondary enclosure to which it is connected into communication with one or the other of the main ducts independently of the other first valve. Advantageously, in an embodiment, said first valves are incorporated into a casing of the first elementary motor.

In an improvement of this embodiment, the secondary enclosures of at least two elementary motors are interconnected and suitable for being connected to the main ducts via a single common distribution valve. By putting means in common (a valve in this example), it is possible to reduce the complexity, weight, and cost of the circuit.

In an embodiment, at least one of said distribution valves is a valve having at least two positions and at least three orifices, a first orifice connected to a secondary enclosure, and second and third orifices that are connected respectively to two main ducts of the circuit; the valve having a first position in which it connects the secondary enclosure to a first main duct, and a second position in which it connects said secondary enclosure to another main duct. In certain cases, the distribution valve can also have other positions, e.g. positions in which rather than connecting the chamber of the cylinder to main ducts connected to the pump, it connects the chamber of the cylinder to main ducts connected to pressure accumulators, for example.

This distribution valve may, in particular, be a hydraulic valve, having a moving member actuated as a function of a fluid pressure in a pilot chamber for piloting the hydraulic valve; the pressure prevailing in said pilot chamber being governed by a solenoid valve.

In an embodiment, the first and second elementary motors are sub-motors of the same motor, and are secured to a common outlet member. In certain embodiments, all of the elementary motors are sub-motors of the same motor, all of which are secured to the outlet member of said motor.

In an embodiment, the first and second elementary motors drive respective ones of two distinct outlet members. For example, the first and second elementary motors may be coupled to distinct wheels of the same vehicle.

In an embodiment, the first elementary motor has a cylinder capacity that is different from the cylinder capacity of another elementary motor, but that is preferably close to the cylinder capacity of said other elementary motor. This arrangement makes it possible to increase the number of cylinder capacities of the elementary motors, relative to the situation in which the cylinder capacity of the first elementary motor is equal to the cylinder capacity of each of the other elementary motors. It should be noted, in particular, that, when two elementary motors have cylinder capacities that are close to each other, they are used in opposition, i.e. with one motor active and the other opposing, the two elementary motors advantageously presenting a very high maximum-to-minimum ratio, without the smaller cylinder capacity of one elementary motor being particularly small (the maximum-to-minimum ratio being the ratio between the largest cylinder capacity and the smallest cylinder capacity of the circuit).

In an embodiment, the control system is suitable for operating the valve means, in such a manner that two elementary motors exert torque in opposite directions. In other words, one of the elementary motors is in drive mode, while the other is in opposing mode. The apparent cylinder capacity of the assembly made up of the two elementary motors is equal to the difference in their respective cylinder capacities. If the elementary motors have cylinder capacities that are close to each other, the resulting cylinder capacity is thus very small. This thus advantageously makes it possible, in simple manner, to form a motor having a very high maximum-to-minimum ratio, when the two elementary motors are part of the same motor.

For example, it is possible to design a circuit including mainly a motor with two sub-motors, the larger of the cylinder capacities of the two sub-motors not exceeding 1.5 times the smaller cylinder capacity. This arrangement makes it possible to obtain a high maximum-to-minimum ratio for the motor. If, for example, the larger cylinder capacity is equal to $1.5 \times C$, where C is the smaller cylinder capacity, the maximum-to-minimum ratio is equal to $(1.5C+C)/(1.5C-C)$, i.e. equal to 5.

In an embodiment, the elementary motors are constant-velocity motors. Such elementary motors are characterized by the fact that a constant pump flow rate results in a constant speed of rotation for any relative angular position of the rotary members relative to the stator portions of the elementary motor. The use of constant-velocity elementary motors imparts increased operating stability and increased lifespan to the motor. These properties are particularly important for low-speed motors such as motors for driving the wheels of a vehicle of the construction or farm vehicle type.

In addition, the hydraulic circuit of the invention may be implemented in various operating modes, in which at least one elementary motor is in inactive mode. This inactive mode can be optimized in the following manner:

In an embodiment, the fluid distributor has, for at least one elementary motor, inactivation means suitable for connecting said elementary motor in continuous manner to the main duct having a pressure chosen from among the lower pressure and the higher pressure of the main ducts. As a function of circumstances, it can be preferable to choose low-pressure inactivation, or high-pressure inactivation. When the elementary motor is connected to the lower-pressure main duct, the residual torque that it generates is minimized by means of the fact that the fluid pressure is minimal in the internal members of the elementary motor. That is why, in general, this type of inactivation is chosen. However, during braking stages, high-pressure inactivation can be preferred, in order to benefit from the additional braking torque generated by the high-pressure inactivated elementary motor.

In this embodiment, the inactivation means are suitable for connecting the inactivated elementary motor to the main circuit that is at the chosen pressure continuously. The activation means can thus effect circuit switching by acting on the valve means, or any other necessary action, in such a manner that, at any time, at least during the period for which the elementary motor remains inactivated, the chosen pressure is applied to the secondary enclosures of the inactivated elementary motor.

The inactivation means may be implemented in various manners:

In an embodiment, when the elementary motors are sub-motors of the same motor, the inactivation means include means for detecting the direction of rotation of the motor, said chosen pressure being selected as a function of the direction of rotation of the motor and of the direction of a speed command or of an acceleration command that is applied to the motor. Knowing the direction of rotation of the motor and the direction of the (speed or acceleration) command, the control system can deduce therefrom the direction of the flow of fluid passing through the motor and thus determine that one of the main ducts of the circuit to which it is opportune to connect the inactive elementary motor(s). Advantageously, with this technical solution for selecting the lower pressure, the motor does not need any pressure sensor.

In an embodiment, the inactivation means include a detector suitable for detecting the main duct that is at the lower pressure from among the main ducts. For example, the inactivation means include pressure sensors disposed in the two main ducts, so as to detect the lower of the pressures in these circuits in order to maximize the efficiency of the elementary motors in the drive stages and in the braking stages.

In addition, in an embodiment, causing one or more elementary motors of the motor to go over to an inactive mode can be achieved by means of the fact that, at least for one elementary motor, the pistons are suitable for being retracted, such that they are disengaged from the cam. In this way, the pistons—or the cylinders in which the pistons are situated—no longer generate any braking torque, and the efficiency is thereby improved.

In an embodiment, the control system is suitable for operating the valve means, in such a manner as to reverse the direction of rotation of an outlet member of the motor without reversing the input and output directions of the fluid in the motor. For example, the control system operates the valve means in such a manner that the sum of the cylinder capacities of the elementary motors in opposing mode, which sum is initially less than the sum of the cylinder capacities of the elementary motors in drive mode, becomes greater than said sum of the cylinder capacities of the elementary motors in drive mode because certain elementary motors go over from drive mode to opposing mode. This change then causes the direction of rotation of the outlet member of the motor to be reversed. This reversal of the direction of rotation of the motor takes place without reversing the direction of the flow of fluid driven by the pump. Advantageously, it is thus possible to use a simple pump and it is not necessary to use a flow-reversing pump. The control system thus makes it possible to reverse the direction of rotation of the elementary motor, without affecting the operating modes of the other elementary motors. This property makes it possible, in particular, to use the circuit for steering the vehicle, when the elementary motors drive different wheels of a vehicle: it then makes maneuvering of the "skid-steer" type possible.

In analogous manner, in an embodiment, the control system is suitable for operating the valve means in such a manner as to maintain the direction of rotation of an outlet member of the motor constant, during a reversal of input and output directions in which the fluid is input and output through the motor. Such operation is useful, above all, when the circuit is fed via pressure accumulators, with which accumulators the direction of the fluid can change when one of the accumulators is empty or reaches its maximum pressure. The control system then maintains the states of the elementary motors as constant as possible, and advantageously masks the change of feed of said motors, which change can cause the input/output direction of the fluid in the motor to be reversed.

In an embodiment, the control system of at least one elementary motor is disposed in the immediate vicinity of said elementary motor or is incorporated therein.

In an embodiment, the valve means are also connected to the two secondary enclosures of at least one other elementary motor, said valve means being suitable for putting each of the secondary enclosures of said at least one other elementary motor into communication with either one or the other of the main ducts, independently of the other secondary enclosures. The resulting circuit thus advantageously has multiple cylinder capacities, namely up to eight different non-zero cylinder capacities, i.e. four cylinder capacities in one direction, and four cylinder capacities in the opposite direction, if the two elementary motors have cylinder capacities that are different from each other.

In an embodiment, in the circuit, at least one first elementary motor is coupled to a first movement member for moving a vehicle, and at least one second elementary motor is coupled to a second movement member for moving a vehicle; the control system of the first motor being suitable for causing the first motor to rotate, and thus for causing the first movement member to rotate, at a speed that is different from the speed of the second movement member or in a direction that is opposite from the direction of the second movement member. The fact that the movement members are driven at different speeds, or indeed in opposite directions, causes the vehicle to turn. If the movement members are merely driven at different speeds, the vehicle follows a curve; if they are driven in opposite directions, the vehicle turns on the spot. These possibilities are particularly advantageous for vehicles having a small amount of maneuvering space, such as, for example, certain farm vehicles.

The use of these motors also makes it possible to form an anti-spin system by reducing the cylinder capacity of one motor (or indeed by reducing it to zero) in the event that the speed of the wheel is too high relative to the speeds of the other wheels of the vehicle.

In an embodiment, the circuit further includes two pressure accumulators, and includes at least four main ducts; two first main ducts are connected to said two pressure accumulators; two second main ducts are suitable for being connected to a pressurized fluid source other than said pressure accumulators; and the valve means are suitable for connecting the secondary enclosures of the elementary motors of a first group of elementary motors to the first main ducts, and for connecting the secondary enclosures of other elementary motors constituting a second group of elementary motors to the second main ducts. Advantageously, the two pressure accumulators may be used for storing energy in the form of fluid pressure, during the braking stages, and for delivering drive during the drive stages. The above-described reversal method then makes it possible, while maintaining the same direction of rotation, to reverse the flow, through the motor so that said motor is fed by the energy reserve in acceleration mode, and fills said reserve in braking mode.

The pressure accumulators also make it possible to decouple operation of the pressurized fluid source feeding the motor from operation of the motor itself.

Finally, the large number of cylinder capacities of this motor makes it possible to choose the torque (drive torque or braking torque) to be applied to the shaft of the motor. It is also possible, without adding any additional valve, to deactivate the motor totally by deactivating all of the elementary motors (causing them to go over to inactive mode).

In another embodiment of the circuit of the invention with two pressure accumulators, the circuit includes only two main circuits, and further includes a selector interposed on the main ducts and having at least two positions, namely a first position that makes it possible to connect the elementary motors to the two pressure accumulators, and a second position that makes it possible to connect the elementary motors to a pressurized fluid source other than the pressure accumulators. In this situation, the pressure accumulators are designed to be suitable for temporarily or permanently replacing the pump or the pressurized fluid source delivering to the elementary motors the energy that enables them to operate.

The invention can be well understood and its advantages appear more clearly on reading the following detailed description of embodiments shown by way of non-limiting examples. The description refers to the accompanying drawings, in which.

Unless otherwise indicated, it should be noted that the circuits presented may have additional elements (not shown) and in particular the usual elements that are well known in hydraulic circuits, such as booster pumps, pressure-relief devices, etc.

A hydraulic transmission circuit of the invention is described below with reference to FIG. 1.

This circuit 10 includes a motor 15, made up of three elementary motors 12, 14, 16. These three elementary motors deliver their respective torques to a common outlet shaft 18.

The circuit 10 also includes a hydraulic pump 20, and two main circuits 26 and 28 connected to the two main orifices of said pump, and serving as fluid feed or fluid discharge ducts for the various elementary motors of the circuit 10.

The circuit 10 also has a fluid distributor 30 for distributing fluid from the main ducts 26 and 28 to the elementary motors 12, 14, and 16.

The ducts that make it possible to feed fluid to and to discharge fluid from the elementary motors 14 and 16 are not shown because various circuits are known for feeding such elementary motors 14 and 16 from a hydraulic pump 20, via main ducts 26, 28. While remaining within the ambit of the invention, any known sub-circuit may be used for feeding fluid to and for discharging fluid from the two elementary motors 14 and 16.

The fluid distributor 30 is made up of two distribution valves 34, 36. The two valves are solenoid valves that are identical to each other. Each of the valves 34 and 36 has three orifices A, B, C. The orifice A is connected via a pipe 22 to a first main duct 28; the orifice B is connected via a pipe 24 to the second main duct 26; the orifice C of the valve 34 is connected to a first secondary enclosure 25 of the elementary motor 12; the orifice C of the valve 36 is connected to the other enclosure 27 of the elementary motor 12. Each of these valves 34, 36 has a moving slide that has two stable positions. The position of the slide is controlled by an electric actuator (not shown) that is operated by a control system 40 that is central to the hydraulic transmission circuit 10.

Each of the valves 34, 36 has two stable positions I and II. In position I, the valve connects the enclosure of the elementary motor that is connected to said valve to the pipe 22 and thus to the first main duct 28; in position II, the valve connects the enclosure of the elementary motor that is connected to said valve to the pipe 24 and thus to the other main duct 26.

Each of the valves 34 and 36 may be operated by the control system 40 independently of the other valve. The elementary motor 12 can thus be used in the following manner: it can be inactive, and not deliver any drive torque or braking torque, when both valves are in position I or in position II.

When the valve 34 is in position I and when valve 36 is in position II, the motor delivers torque in a first direction; when the positions of these two valves 34 and 36 are inverted, the motor delivers reversed output torque.

Thus, depending on the situation, the elementary motor either has zero torque and zero cylinder capacity, or it has drive torque that is added to the torque delivered by the other elementary motors, or else it delivers opposing torque that is subtracted from the torque delivered by the other elementary motors.

Two embodiments of hydraulic transmission circuits of the invention are described below with reference to FIGS. 2 and 3.

Figure 1:
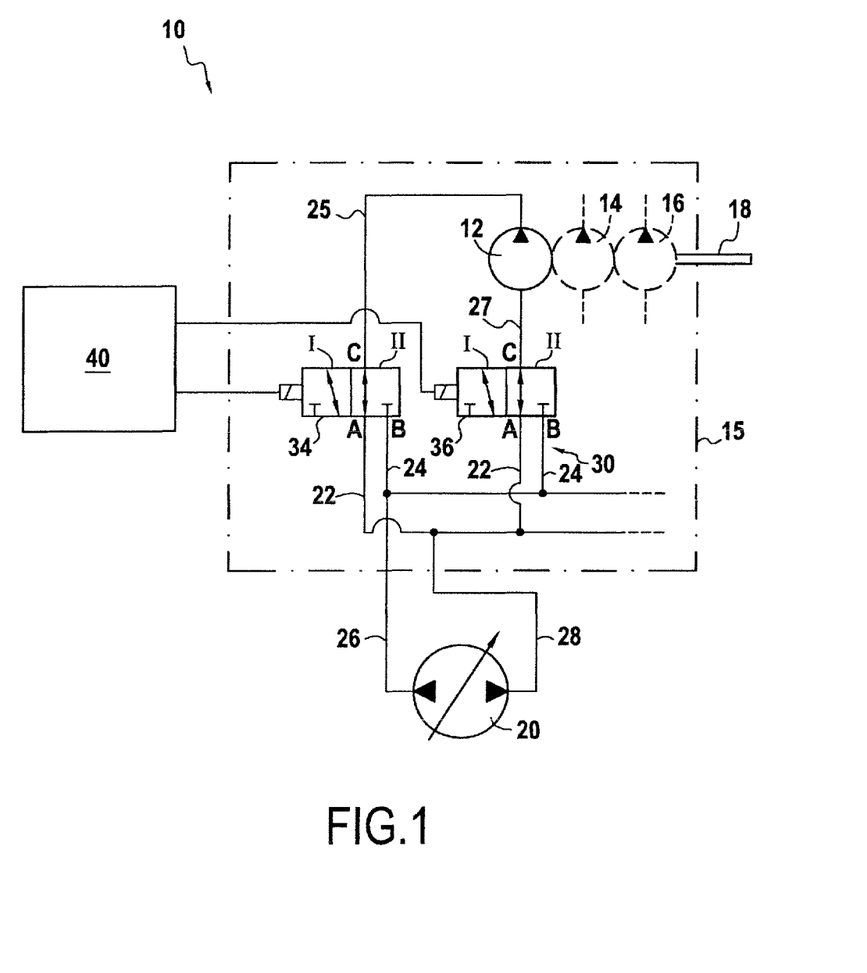
FIG. 1 is a diagrammatic view of a hydraulic transmission circuit of the invention, in a generic configuration.

By convention, the elements of these circuits that are analogous to the elements shown in FIG. 1 bear references equal to the respective references of the elements in FIG. 1, plus a multiple of 100, and are described again only where necessary.

Figure 2:
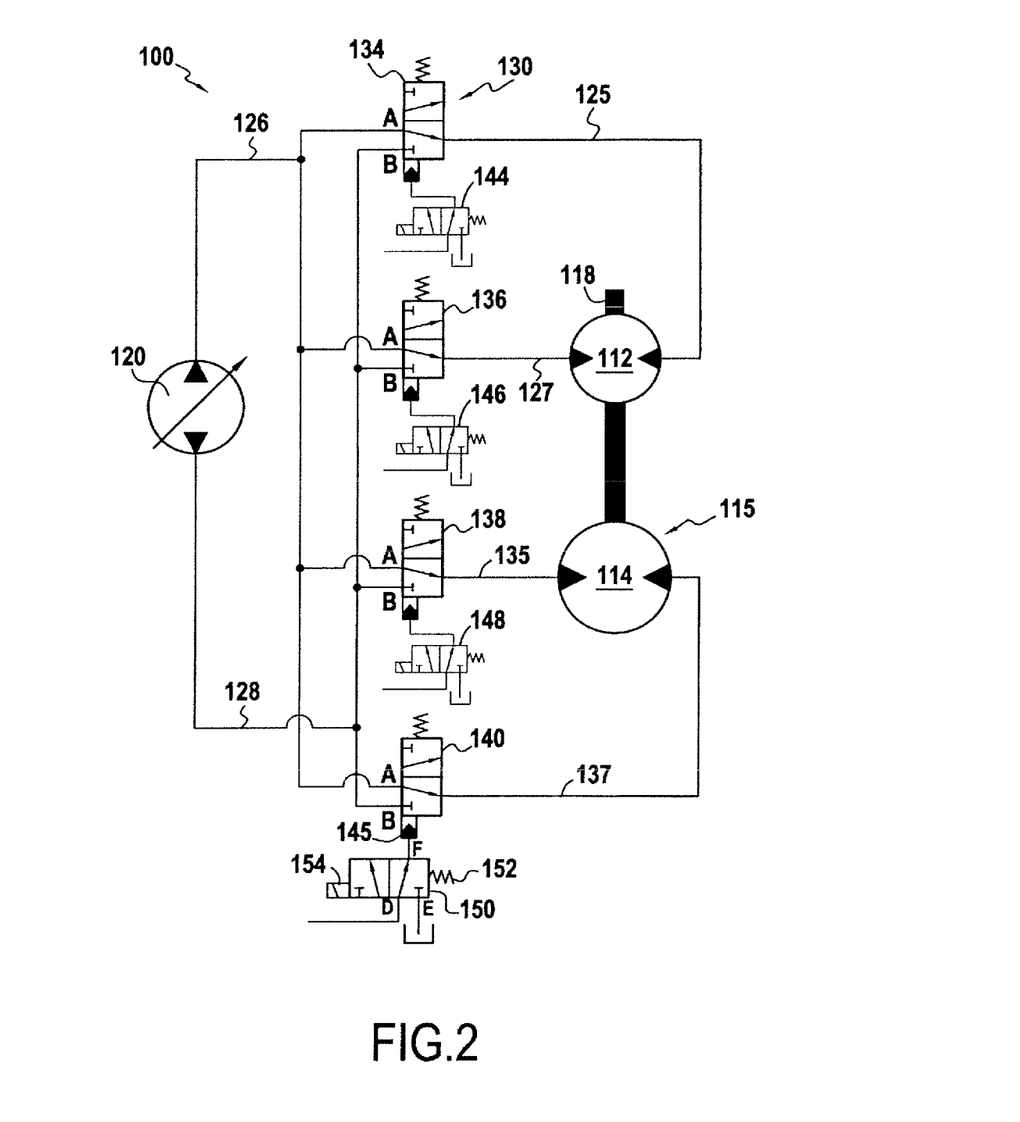
FIG. 2 is a diagrammatic view of a hydraulic transmission circuit of the invention, in an embodiment with a motor having two elementary motors and four distribution valves.

FIG. 2 shows a hydraulic transmission circuit 100 including a pump 120 feeding a motor 115 having two elementary motors 112 and 114, via two main ducts 126 and 128. The elementary motors 112 and 114 are coupled to an outlet shaft 118.

Like the device of FIG. 1, the device 100 has a fluid distributor 130. Whereas, a priori, the motor 15 has two distribution valves for only one of its elementary motors 12, which valves are connected to the feed and discharge enclosures of said motor, conversely the motor 115 has such features for both of its elementary motors 112 and 114. It has valves means formed essentially by four distribution valves 134, 136, 138, and 140.

The valves 134 and 136 are connected to the secondary enclosures 125 and 127 of the elementary motor 112, and the valves 138 and 140 are connected to the secondary enclosures 135 and 137 of the elementary motor 114.

These four valves are of substantially the same structure as the above-mentioned solenoid valves 34 and 36, except that each of them is a hydraulic valve having its slide operated by hydraulic control chambers rather than by an electric actuator.

The pressure of these hydraulic control chambers is governed by identical pilot solenoid valves 144, 146, 148, and 150 that pilot the pressures in the control chambers as a function of setpoints transmitted by the control system.

For reasons of simplification, only the solenoid valve 150 is described in detail below.

The solenoid valve 150 has three orifices D, E, F.

The orifices D and E are inlet orifices. The orifice D is connected to a line in which a control pressure prevails; the orifice E is connected via a pipe to a pressure-free reservoir. The outlet orifice F of the valve 150 is connected to the hydraulic control chamber 145 of the hydraulic valve 140. The solenoid valve 150 also has a return spring 152, and an electric actuator 154 that acts in the opposite direction on the moving slide of the solenoid valve 150.

Each of the valves 134, 136, 138, and 140 is connected, via its two inlet orifices A and B to the two main ducts 126 and 128 of the device 100. The valves 134 and 136 are connected via their outlet orifices C to respective ones of the two secondary enclosures 125, 127 of the elementary motor 112. The valves 138 and 140 are connected via their outlet orifices C to respective ones of the two secondary enclosures 135, 137 of the elementary motor 114. Thus, the four valves 134-136; 138-140 are suitable for putting the elementary motors 112 and 114 into respective ones of the following four operating modes: high-pressure or low-pressure inactive, with the secondary enclosures being connected either to the high pressure or to the low pressure of the pump; drive; and opposing.

The two elementary motors 112 and 114 do not have the same cylinder capacity. Thus, the motor 115 advantageously has four different cylinder capacities. In addition, it should be noted that it does not have a preferred operating direction, and, finally, that it is not necessary to use a reversible pump because, with a constant direction for the flow of fluid, the control system, in association with the valves 134, 136, 138, and 140 makes it possible to reverse the direction of rotation of the motor.

Figure 3:
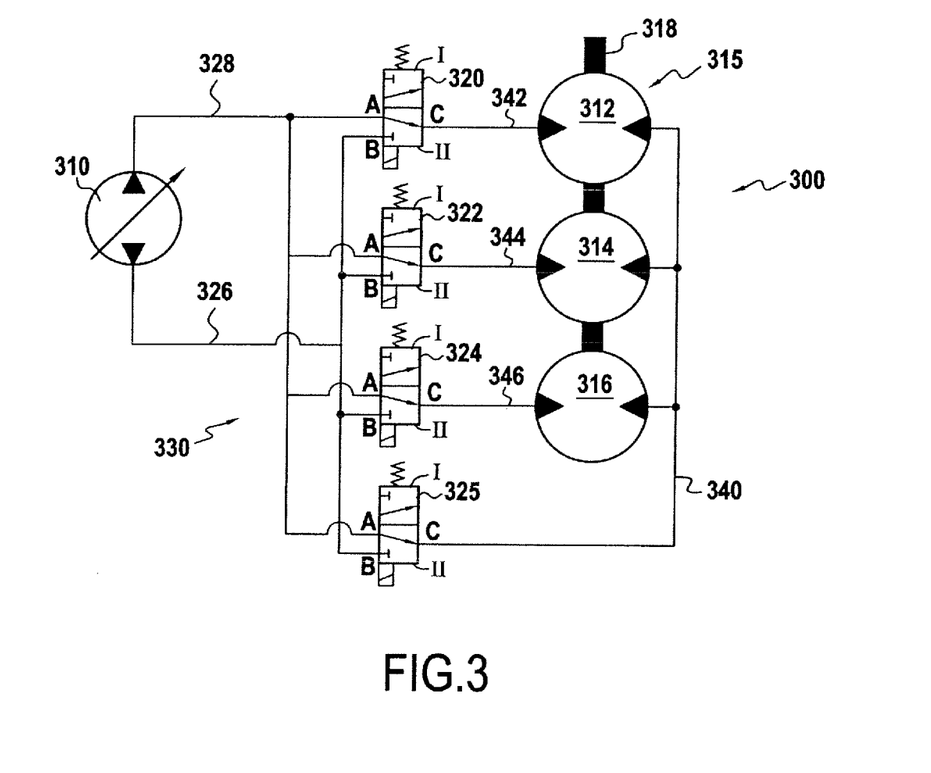
FIG. 3 is a diagrammatic view of a hydraulic transmission circuit of the invention, including a motor having three elementary motors and four distribution valves.

FIG. 3 shows another hydraulic transmission circuit of the invention.

The hydraulic circuit 300 includes a pump 310, a motor 315 made up of three elementary motors 312, 314, and 316 that are coupled to an outlet shaft 318 of the motor 315.

Each of the elementary motors 312, 314, and 316 has two enclosures respectively for its feed and for its discharge. The pressures in these six enclosures are governed by a fluid distributor 330 of the hydraulic transmission circuit. The fluid distributor 330 is made up of four distribution valves 320, 322, 324, and 325. These valves are solenoid valves of internal structure identical to the internal structure of the valves 34 and 36 (described in detail with reference to FIG. 1).

The orifices A and B of the valves 320, 322, 324, and 325 are connected to respective ones of the two main ducts 326 and 328, which main ducts are connected to the main orifices of the pump 310. In a first position I, the valves 320, 322, and 324 put the main duct 326 into communication with the first secondary enclosures 342, 344, and 346 of the elementary motors 312, 314, and 316. In their second positions II, the valves 320, 322, and 324 put the main duct 328 into communication with the first secondary enclosures 342, 344, and 346 of the elementary motors 312, 314, and 316.

The second secondary enclosures of the three elementary motors 312, 314, and 316 are interconnected and are put into communication with the orifice C of the valve 325 via a duct 340. This valve 325 has two positions. In a first position I, which is a default position, the valve 325 puts the main duct 326 into communication with the pipe 340 and thus with the second secondary enclosures of the elementary motors 312, 314, and 316. In its second position II, the valve 325 connects the main duct 328 to the pipe 340, and thus to the second secondary enclosures of the elementary motors 312, 314, and 316.

This hydraulic circuit arrangement gives identical roles to all three elementary motors. By using only four two-position valves, it makes it possible to have three active cylinder capacities in each direction, which capacities are obtained by combining one, two, or three of the respective cylinder capacities of the three elementary motors.

A motor 400 adapted to implementing the invention in the form of a hydraulic motor is described below with reference to FIGS. 4 and 5.

The hydraulic motor 400 comprises:

a casing 402 made up of four portions 402A, 402B, 402C, and 402D that are assembled together by screws (not shown);

an outlet shaft 406 mounted to rotate about an axis X, relative to the casing 402, by means of conical rolling bearings 408, and provided with fluting 410 disposed on its end that is contained inside said casing 402;

a cylinder block 412 provided with internal fluting 414 that co-operates with the fluting 410 on the outlet shaft 406 so as to constrain these two parts to rotate with each other, said cylinder block 412 being contained inside the casing 402, and having eight cylinders 416 disposed radially, and angularly spaced apart in uniform manner;

pistons 418 mounted to slide in said cylinders 416, one per cylinder, and each provided at its end external to the corresponding cylinder, with a rotary roller 420 suitable for bearing against the undulating inside surface of the portion 402B of the casing, which portion is shaped into a cam 422 having six lobes;

an internal fluid distributor 430, including, in particular, a port plate 435 having a plane face 432 perpendicular to the axis X and, bearing against a plane face 434 that is also perpendicular to the axis X, and with which the cylinder block 412 is provided; the port plate 435 being constrained to rotate with the portion 402C of the casing, and thus with the cam 422, by means of studs 424, and, in its radially outer face, also being provided with four grooves G1, G2, G3, and G4 that extend coaxially around the axis X;

cylinder ducts 426, one per cylinder, connecting the chambers 428 defined by the cylinders 416 and the corresponding pistons 418 to the plane face 434 of the cylinder block 412, in which face they open out via cylinder orifices that are spaced apart uniformly, while being centered on a circle 425 that is coaxial about the axis X;

distribution ducts 436 provided in the port plate 435, and opening out in the plane face 432 thereof via orifices also centered on the circle 425, there being twelve distribution ducts 436, i.e. one duct per lobe ramp (rising ramp or falling ramp) of the cam; each of the distribution ducts 436 being connected to a respective one of the grooves G1 to G4, so that, during the rotation of the motor, each cylinder duct 426 is brought to communicate in succession with the grooves G1, G2, G3, G4 and then again G1, G2, G3, G4, etc. or in the reverse order depending on the direction of rotation of the motor;

two bores 440 and 442, provided in the portion 402C of the casing, and opening out on either side thereof along the axis X; two slidably mounted slides 444 and 446 for selecting the cylinder capacity being mounted in respective ones of the bores 440 and 442;

two control chambers 448 and 450 for the respective slides 444 and 446, provided in bores that are formed through the face of the casing 402D that is situated on the side of the casing 402C that faces the bores 440 and 442, said chambers 448 and 450 receiving respective ones of the ends of the slides 444 and 446 while also being connected to two external ducts (not shown) via link ducts 452 and 454;

two grooves F1 and F2, extending coaxially around the axis X of the motor, which grooves are provided in the casing 402C; the groove F1 communicating via a coupling 458 with an external duct (not shown), and the groove F2 communicating via a coupling 459 with an external duct (not shown);

three grooves A1, A2, and A3, provided in the portion 402C of the casing, which grooves extend coaxially around the bore 440, the groove A1 communicating firstly with the groove F1 via a duct 455, and secondly with the groove G1 via a duct 456; the central groove A2 communicating with the groove G3 via a duct 460; and the groove A3 communicating firstly with the groove G4 via a duct 462, and secondly with the groove F2 via a coupling 465;

three grooves B1, B2, and B3, provided in the portion 402C of the casing, which grooves extend coaxially around the bores 442, the groove B1 communicating with the groove F1 via a duct 464; the central groove B2 communicating with the groove G4 via a duct 466, and the groove B3 communicating with the groove F2 via a duct 468; and two helical springs 470 and 472, wound around the slides 444 and 446 in wider portions of respective ones of the bores 440 and 442; one end of each of the springs bearing against the end wall of a respective one of said wider portions, and the other end being secured to the end of a respective one of the slides 444 and 446 by a respective circlip 474 associated with a respective washer 476; the springs having an effect opposing the effect of the fluid pressure inside the control chambers 448 and 450.

The couplings 458 and 459 are designed to be connected to the main orifices of a hydraulic pump, in such a manner as to feed pressurized fluid to the motor and to discharge pressurized fluid therefrom. The couplings 452 and 454 are designed to be connected to a control system for controlling the motor 400, which system is suitable for delivering fluid under high pressure or under low (zero) pressure as a function of the positions desired for the respective slides 444 and 446.

The slides 444 and 446, together with the grooves A1, A2, & A3, and B1, B2, & B3 and with the associated link means, constitute two distribution valves 480 and 482, each of which has two positions. The slide 440 has a wide groove 484 and thus, in a first position shown in FIG. 4 (slide 440 on the left), the groove 484 of the slide 440 puts the grooves A1 and A2 into communication with each other, and thus puts the grooves G1 and G3 into communication with each other (the groove A3 remaining connected to F2). In a second position, the groove 484 puts the grooves A2 and A3 into communication with each other and thus puts the grooves G3 and G2 into communication with each other (the groove A1 remaining connected to F1).

Figure 4:
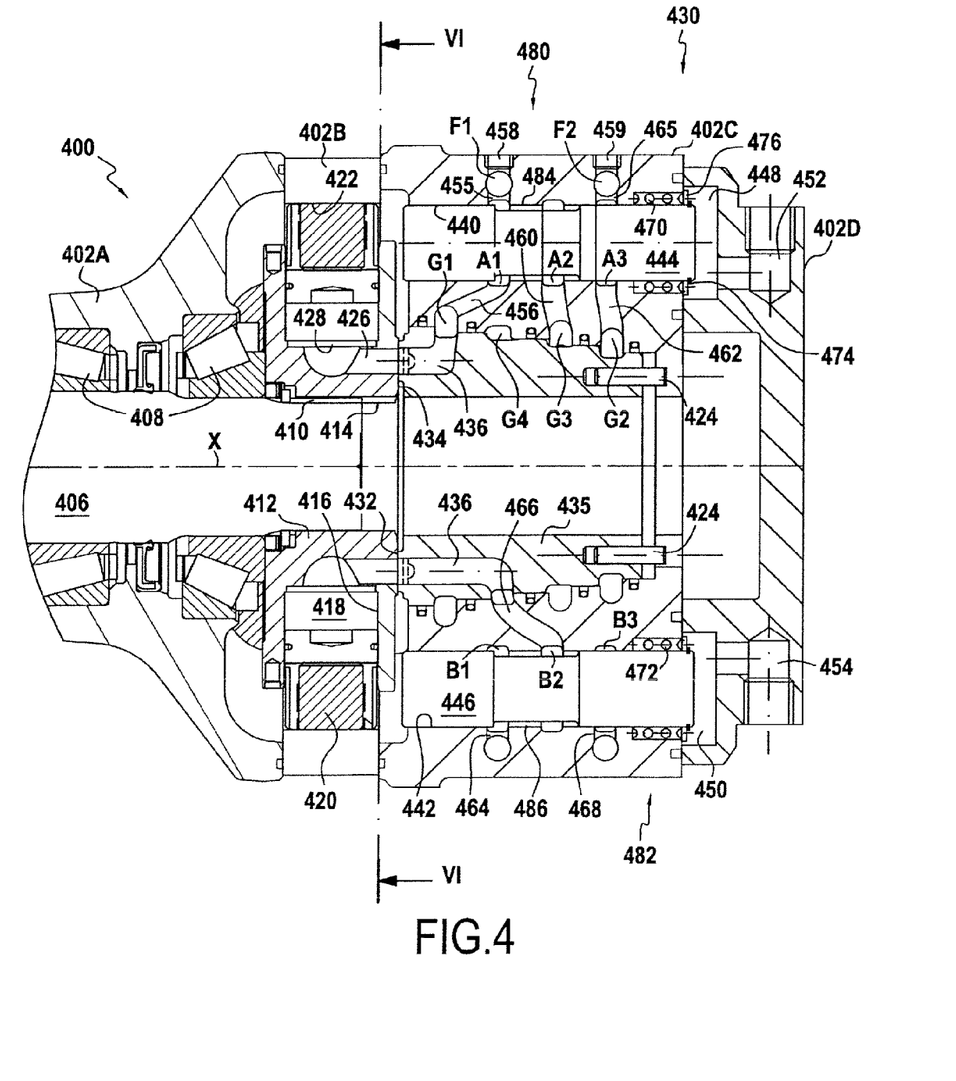
FIG. 4 is a longitudinal section view of a motor having two sub-motors, and that can be used in a circuit of the invention.
Figure 5:
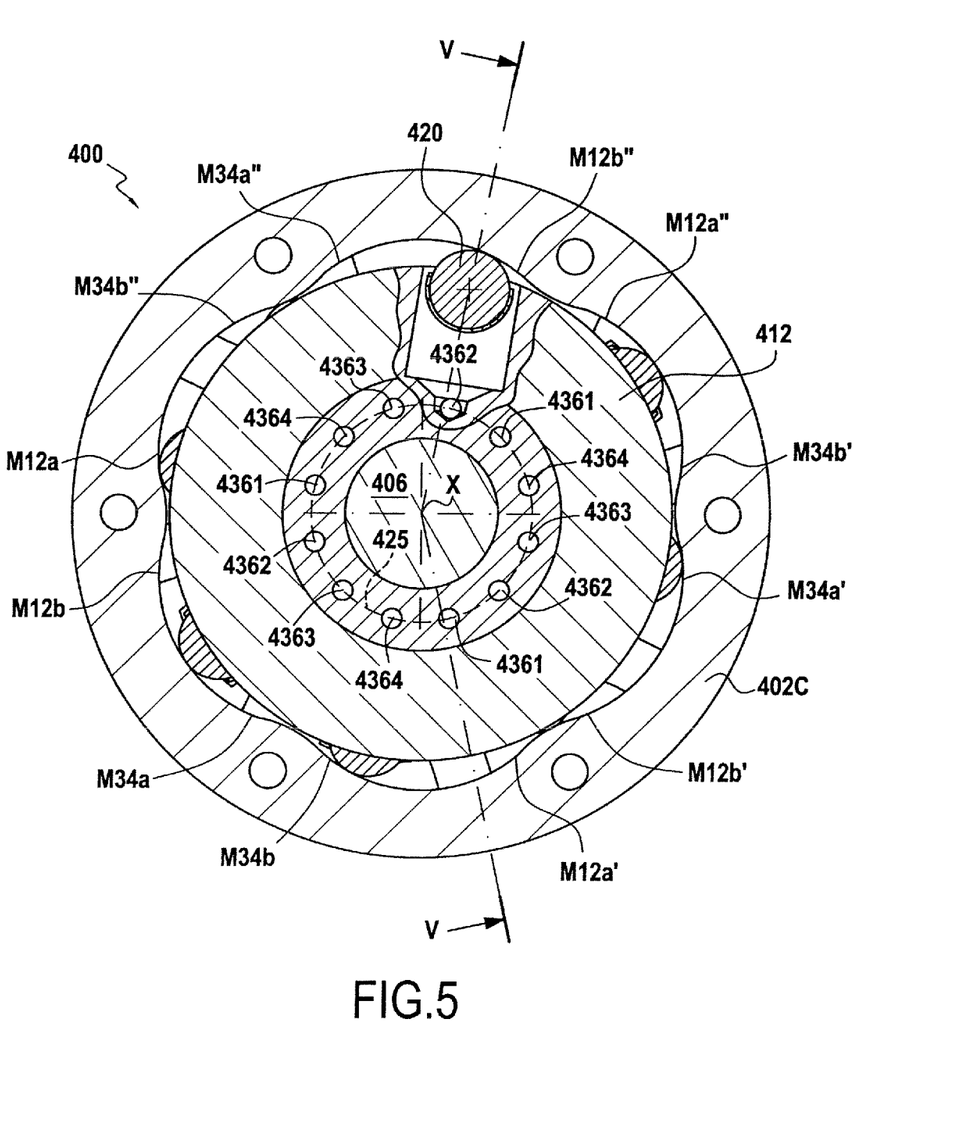
FIG. 5 is an axial section view, at the cylinder block, of the motor shown in FIG. 4, on the section V-V.

Similarly, the slide 446 has a wide groove 486 and thus, in a first position shown in FIG. 4 (slide 446 on the left), the groove 486 of the slide 446 puts the grooves B1 and B2 into communication with each other, the groove B3 remaining connected to F2. In a second position, the groove 486 puts the grooves B2 and B3 into communication with each other, the groove B1 remaining connected to F1.

As a result of its above-described structure, the motor 400 has two elementary motors M12 and M24, each of which has three respective lobes of the cam 422. Thus, the cam is subdivided (see FIG. 5) into twelve half-lobes that are respectively rising or falling lobes in the following order: M12$a$, M12$b$, M34$a$, M34$b$, M12$a'$, M12$b'$, M34$a'$, M34$b'$, M12$a''$, M12$b''$, M34$a''$, M34$b''$, in which half-lobes, the lobes M12$xx$ are part of the first elementary motor M12, the secondary enclosures of which are the grooves 1 and 2; the lobes M34$xx$ are part of the second elementary motor M34, the secondary enclosures of which are the grooves 3 and 4. The half-lobes that have a in their references are rising half-lobes, while those that have b in their references are falling half-lobes. In FIG. 5, the distribution ducts 436 are referenced as a function of the grooves to which they are connected: the ducts 4361 are connected to the groove 1; the ducts 4362 are connected to the groove 2, the ducts 4263 are connected to the groove 3, and the ducts 4364 are connected to the groove 4.

In the motor 400, the grooves G1 and G2 are connected permanently to respective ones of the two main orifices of the pump. Conversely, each of the grooves G3 and G4 is connected either to one or to the other of said orifices, as a function of the positions of the slides 444 and 446. Thus, the motor 400 is a motor having three active operating cylinder capacities: when the grooves G3 and G4 are put to the same pressure, the elementary motor M34 is inactive and does not deliver any torque. The cylinder capacity is the cylinder capacity C12 of the elementary motor M12. When the grooves G3 and G4 are at different pressures, the cylinder capacity C34 of the elementary motor M34 is, depending on the situation, added to or subtracted from the cylinder capacity of the elementary motor M12. Thus, the cylinder capacity of the motor 400 is then either C12+C34 or C12−C34.

Figure 6:
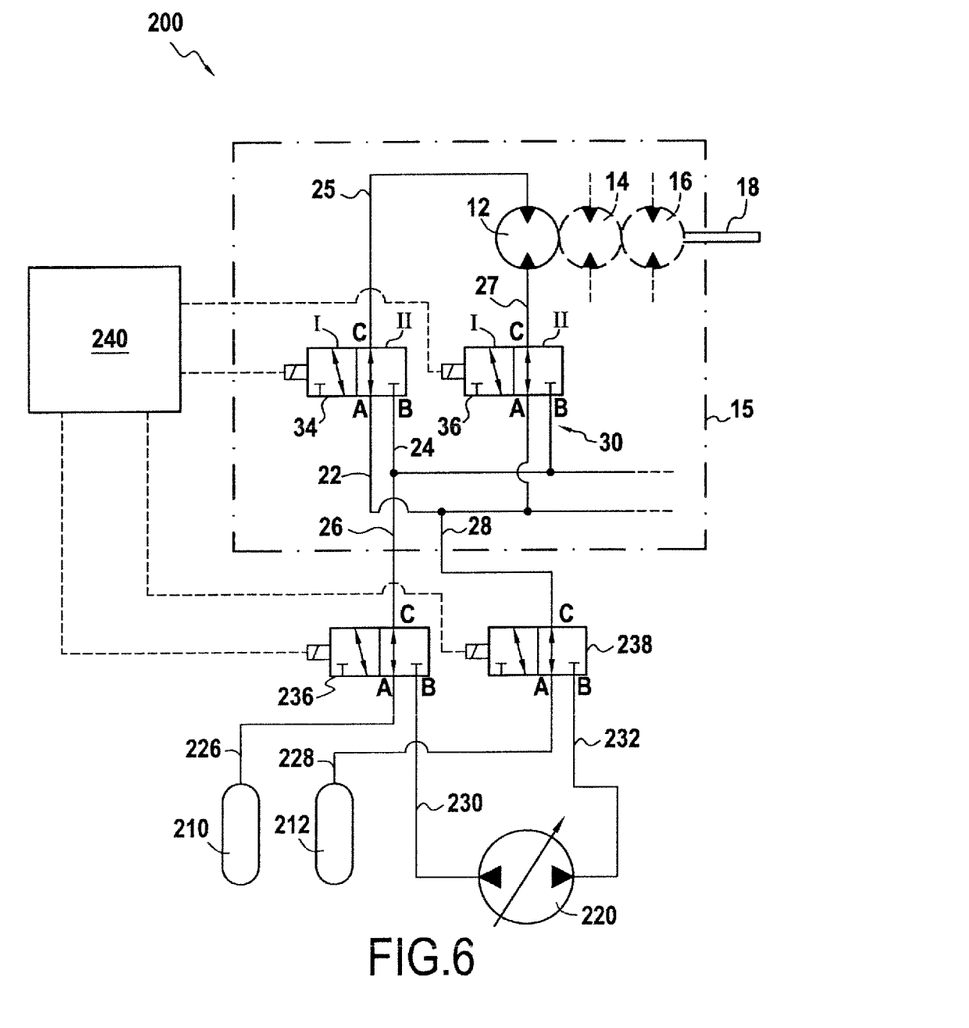
FIG. 6 is a diagrammatic view of a hydraulic transmission circuit of the invention, including two pressure accumulators and a pump.

The motor 400 is a motor with which it is particularly simple to implement the invention. More generally, the casing 402C can be arranged to receive one or two additional distribution valves that are similar to the valves 480 and 482. Instead of connecting the grooves G1 and G2 directly to the main ducts of the motor F1 and F2, it is the central groove(s) of the slides of said additional valve(s) that are connected to respective ones of the grooves G1 and G2. The additional valves then make it possible, as a function of the positions of their respective slides, to put G1 or G2 into communication with one or the other of the main ducts. With reference to FIG. 6, a hydraulic transmission circuit 200 of the invention, including two pressure accumulators and a pump device constituted essentially by a pump, is described below.

The circuit 200 includes a motor 15 identical to the motor of the circuit 10 described with reference to FIG. 1. However, the arrangement of the main circuits 226, 228, 230, 232 of the circuit 200 is different from the arrangement of the circuit 10.

This difference is due to the fact that the circuit 200 is fed with pressurized fluid by two pressurized fluid sources, namely a pump 220 and two pressure accumulators 210 and 212. Two selection valves 236 and 238 serve to select the pressurized fluid source that is to be connected to the main circuits 26 and 28 of the motor 15.

The valve 236 is a two-position valve. Its orifice C is connected to the distribution duct 26. Its two orifices A and B are connected respectively to the pressure accumulator 210 and to a first main orifice of the pump 220, via respective ones of the main ducts 226 and 230. It thus makes it possible to connect the main duct 26 either to the pressure accumulator 210, or to the first main orifice of the pump 220.

The valve 238 is a two-position valve. Its orifice C is connected to the distribution duct 28. Its two orifices A and B are connected respectively to the pressure accumulator 212 and to a second main orifice of the pump 220, via respective ones of the main ducts 228 and 232. It thus makes it possible to connect the main duct 28 either to the pressure accumulator 212 or to the second main orifice of the pump 220.

The valves 236 and 238 are solenoid valves controlled by a control unit 240. Said control unit also controls the motor 15, and in particular the valves 34 and 36 thereof, like the control unit 40 described with reference to FIG. 1. The control unit 240 makes it possible to use the energy stored in the form of pressurized fluid in the pressure accumulators, and to store energy during the braking stages.

By means of this use of the pressure accumulators, the circuit 200 presents high energy efficiency, since some of the energy is recovered and stored in the pressure accumulators during the braking stages, and is then used subsequently.

Figure 7A:
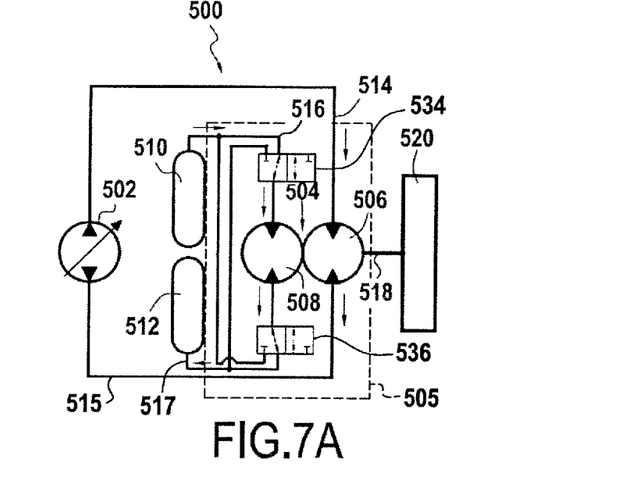
FIGS. 7A and 7B are diagrammatic views of another hydraulic transmission circuit of the invention including two pressure accumulators and a pump, in respective one of two operating states.
Figure 7B:
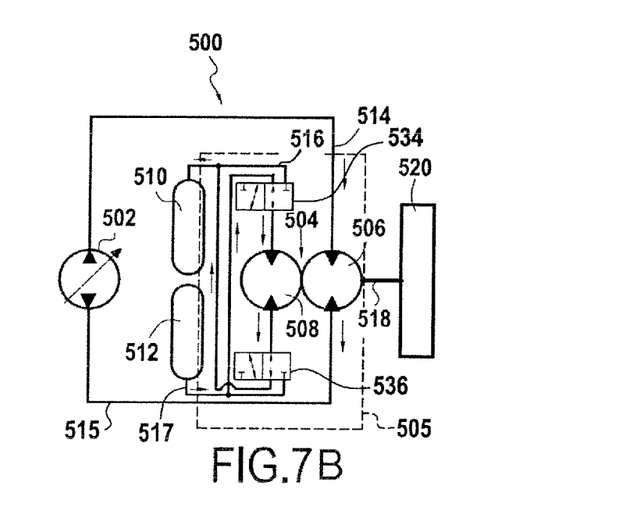
Figure 8A:
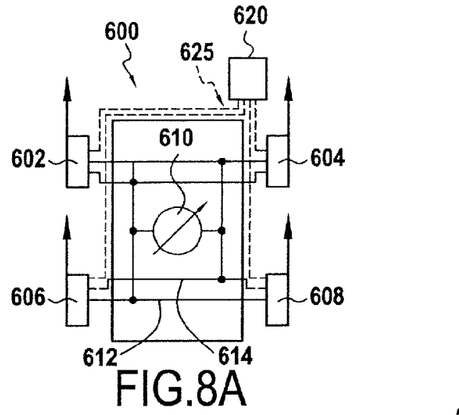
FIGS. 8A to 8E are diagrammatic views of a hydraulic circuit of the invention having four motors, used in different operating configurations.
Figure 8B:
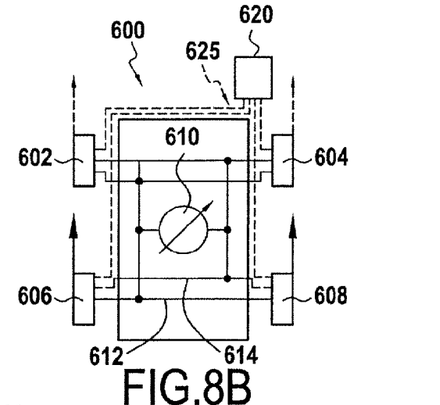
Figure 8C:
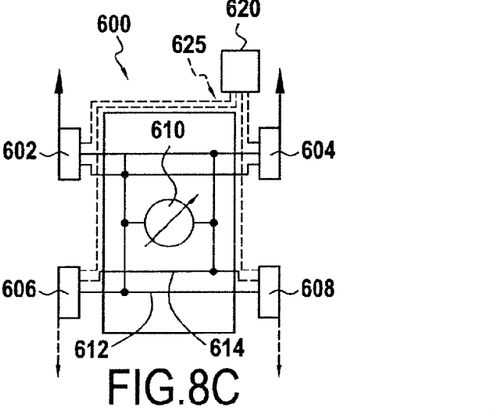
Figure 8D:
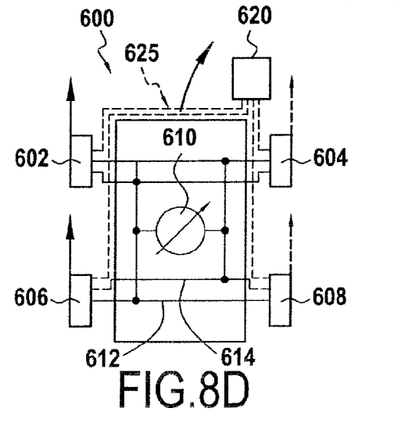
Figure 8E:
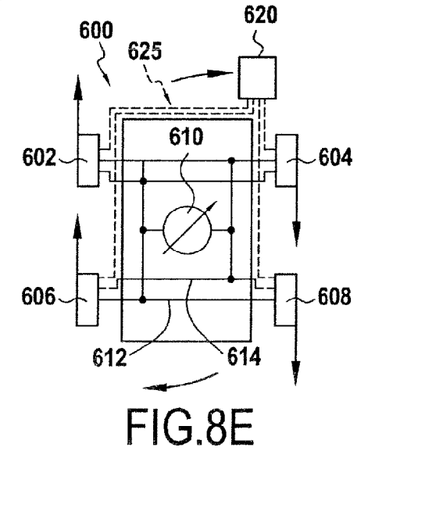

With reference to FIGS. 7A and 7B, a hydraulic circuit 500 of the invention, in an embodiment that is different from the hydraulic circuit 200 of FIG. 6, is described below in two operating modes.

The hydraulic circuit 500 includes: a hydraulic pump 502 having a variable flow rate; a hydraulic motor 504 with two elementary motors 506 and 508; two pressure accumulators 510 and 512 that are respectively high-pressure and low-pressure accumulators. The main orifices of the pump 502 are connected via two main ducts 514 and 515 to the feed and discharge orifices of the elementary motor 506. The orifices of the accumulators 510 and 512 are connected via two other main ducts 516 and 517 to the elementary motor 508.

The motor 504 has an outlet shaft 518, to which the two elementary motors 506 and 508 deliver torque; said shaft 518 is coupled to a wheel 520.

The casing 505 of the motor 504 encloses the two elementary motors 506 and 508, and the distribution valves 534 and 536 of the elementary motor 508.

Operation of this hydraulic circuit, and in particular the respective roles played by the two elementary motors 506 and 508 that have different fluid feeds is shown by FIGS. 7A and 7B.

FIG. 7A shows forward operation of the motor in an operating mode with use being made of the energy stored in the pressure accumulators.

Under the effect of the pressure of the fluid delivered by the pressure accumulator 510 and that flows through the elementary motor 508 before reaching the other pressure accumulator 512, said elementary motor 508 delivers first torque to the shaft 518. In conventional manner, and under the effect of the fluid flow rate delivered by the pump 502, the elementary motor 506 applies second torque to the shaft 518. Depending on the pressures established in the circuit 514 at the terminals of the elementary motor 506, this second torque can be added to or subtracted from the first torque of the elementary motor 508 so as to obtain the desired torque on the wheel 520.

FIG. 7B shows an opposite situation, in which energy is stored. The elementary motor 508 sends the pressurized fluid back into the high-pressure accumulator 510. The torque necessary for driving the elementary motor 508 in this situation can be delivered by the wheel when the vehicle is in a braking stage. As explained above, the torque generated by the elementary motor 506 can be added to or subtracted from the torque of the wheel in such a manner as to compensate for the difference between the desired torque for braking the wheel and the torque necessary for driving the elementary motor 508 that fills the accumulator.

It is also possible to store energy while the vehicle is in an acceleration phase, the energy that is taken not therefore being convertible into energy for driving the vehicle. In such a situation, the elementary motor 506 must deliver, at the same time, both the torque to the wheel 520 in order to enable the vehicle to accelerate, and also the torque necessary for the motor 508 to fill the accumulator. This configuration can be useful for storing energy when the vehicle's acceleration needs are low or indeed zero (traveling at constant speed), and for using this energy under circumstances under which high wheel-torque needs require action from both of the motors 506 and 508.

Use of one or the other of the operating modes described in detail above is chosen as a function, in particular, of the respective extents of fullness of the accumulators 510 and 512. When the high-pressure accumulator 510 starts to become empty, it is possible to make provision for a filling stage to take place, even though that penalizes the power available on the outlet shaft 518 of the motor.

Other operating modes, in which one or the other of the elementary motors is rendered inactive, are not described in detail.

To summarize, in such a circuit 500, the elementary motor 506 can be operated by the control system (not shown) as follows: to deliver additional drive torque, i.e. top-up drive torque; or to deliver additional braking torque; or else it can remain inactive. The presence of said elementary motor 506, associated with the pressure accumulators 510 and 512, makes it possible, for example, to have torque that, during a drive stage or during a braking stage, is higher than the torque that it would be possible to have by using solely and directly the fluid pressure delivered by the pump.

More generally, the multiple cylinder capacities that the hydraulic circuit 500 has thus make it possible to adapt the flow rate of fluid that is consumed by the motor, and to adapt the torque that is delivered, as a function of the available pressure in the pressure accumulator. In such a hydraulic circuit 500, the multiple cylinder capacities that are made possible by the motor 504 of the invention are then particularly valuable because they make it possible to compensate for the relative lack of flexibility, during use, of the pressure accumulators 510 and 512.

Finally, by means of the flexibility of the reversal of the direction of flow of fluid to the orifices of the elementary motor 508, said reversal can be caused at any time by the distribution valves of the motor, without it being necessary to reverse the direction of the flow of fluid in the circuit. The use of a reversible pump is not necessary.

In addition, a pump having a fixed flow rate may also be used, because of the operating flexibility of the motor that is imparted by its multiple cylinder capacities. The variations in speed and in torque are achieved, in particular, by changing cylinder capacity. With reference to FIGS. 8A to 8E, five operating modes of a hydraulic circuit of the invention, in an embodiment different from the preceding embodiments, are described below.

The hydraulic circuit 600 shown in FIGS. 8A to 8E makes it possible to feed four hydraulic motors 602, 604, 606, and 608, disposed in respective ones of the four wheels of a vehicle, and making it possible to drive said vehicle.

By convention, in these figures, the front of the vehicle is pointing towards the top of the sheet.

The circuit 600 includes a central pump 610 and two distinct main ducts 612 and 614, connected to respective ones of the two main orifices of the pump. The main duct 612 is connected to a first orifice (feed orifice or discharge orifice) of each of the four motors 602, 604, 606, and 608; the main duct 614 is connected to a second orifice of each of the four motors.

Finally, the hydraulic circuit is equipped with a central control system 620. Said control system transmits setpoints to the respective control systems of the motors 602, 604, 606, and 608 via cables 625. On the basis of these setpoints, the control systems establish the control for the valve means of the various motors 602, 604, 606, and 608.

Each of the four motors 602, 604, 606, and 608 is a motor of the invention. Each of said motors can transmit output torque to the wheel to which it is coupled, which torque is said to be "normal" if it is the maximum torque that can be delivered by the motor, or "reduced" if it is a fraction of that torque, which fraction is strictly less than 1.

In addition, the torque applied to a wheel can be drive torque if it is torque applied in the direction that tends to cause the vehicle to advance in the forward direction when all of the wheels apply torque in that same direction; it can be opposing torque if the torque is applied in the opposite direction. In particular, it should be noted that the output torque applied to the respective wheels by each of said motors may be reversed merely by a command from the control system of the motor, without it being necessary to reverse the direction of flow of the fluid feeding the motors.

By means of the hydraulic circuit 600, the following five drive modes are possible for driving the vehicle, corresponding to FIGS. 8A to 8E:
  normal forward drive (FIG. 8A); each of the four motors delivers normal drive torque;
  fast forward drive (FIG. 8B); each of the two rear motors 606 and 608 delivers normal drive torque; each of the two front motors 602 and 604 delivers reduced drive torque; the total cylinder capacity of the circuit is thus smaller than in the preceding situation, thereby enabling the vehicle to reach a higher speed;
  very fast forward drive (FIG. 8C); each of the two front motors 602 and 604 delivers normal drive torque; the two rear motors 606 and 608 deliver reduced opposing torque; the total cylinder capacity of the circuit is thus very small, thereby enabling the vehicle to reach a very high speed;
  right turn (FIG. 8D); each of the two left motors 602 and 606 delivers normal drive torque; each of the two right motors delivers reduced drive torque; the difference in torque causes the vehicle to turn rightwards; and
  rightward on-spot turn (FIG. 8E); each of the two left motors 602 and 606 delivers normal drive torque; each of the two right motors 604 and 608 delivers normal opposing torque, thereby causing the vehicle to turn on the spot.

Naturally, numerous other operating modes that are not shown are possible for the vehicle.

In addition, the use of this type of motor makes it possible, in the event that one of the wheels spins, to reduce the cylinder capacity of the motor, and therefore to reduce its output torque, thereby limiting spinning of the wheel, it being possible for the cylinder capacity to be reduced to the extent that the drive torque is reduced to zero by deactivating all of the elementary motors of said motor.

The invention claimed is:
1. A hydraulic transmission circuit comprising:
  at least first and second elementary hydraulic motors that are associated for providing a common drive, each elementary motor having a first and a second secondary enclosures, one for feed and one for discharge;
  at least two main ducts respectively for fluid feed and for fluid discharge;
  a fluid distributor for distributing the fluid from said main ducts to said elementary motors via their secondary enclosures; and
  a control system for controlling the elementary motors; wherein:
  each of the at least first and second elementary hydraulic motors is either a hydraulic motor or a sub-motor of a hydraulic motor with the sub-motor being a portion of the hydraulic motor, that is capable, when it is fed on its own, of supplying non-zero drive torque to an outlet member of the hydraulic motor, and of doing so regardless of an angular position of said outlet member relative to a stator structure of the hydraulic motor;
  the fluid distributor has valve means connected to the two secondary enclosures of the first elementary motor;
  said valve means are configured to put the first secondary enclosure of the first elementary motor into communication with either one of the two main ducts, independently of the second secondary enclosure, and to put the second secondary enclosure of the first elementary motor into communication with either one of the two main ducts, independently of the first secondary enclosure, whereby the first elementary motor can be put, independently of the operating modes of the other elementary motor(s):
  in inactive operating mode, in which both secondary enclosures of the first elementary motor are connected to a same main duct;
  in drive operating mode, in which the two secondary enclosures of the first elementary motor are connected respectively to the higher pressure main duct and to the lower pressure main duct so that the first elementary motor delivers a drive torque in a desired drive direction that adds to a torque delivered by the other elementary motor(s); and
  in opposing operating mode, in which the two secondary enclosures of the first elementary motor are connected respectively to the higher pressure main duct and to the lower pressure main duct so that the first elementary motor delivers an opposing torque in a direction opposite from the desired drive direction, which subtracts from the torque delivered by the other elementary motor(s); and
    said valve means are configured so that the first elementary motor can be put, independently of the operating modes of the other elementary motor(s):
  in high-pressure inactive operating mode, in which both secondary enclosures of the first elementary motor are connected to a higher pressure main duct having a higher pressure than the other main duct; and
  in low-pressure inactive operating mode, in which both secondary enclosures of the first elementary motor are connected to a lower pressure main duct having a lower pressure than the other main duct.

2. A circuit according to claim 1, wherein the control system includes an activation table that specifies and makes it possible to determine the operating modes of the various elementary motors as a function of a desired cylinder capacity, each operating mode being chosen from among the drive operating mode, the opposing operating mode, and the inactive operating mode.

3. A circuit according to claim 1, wherein the control system is suitable for automatically effecting a plurality of cylinder capacity changes in a predefined order, as a function at least of a speed of rotation of the motor and of a speed or acceleration setpoint transmitted to the control system.

4. A circuit according to claim 1, wherein the valve means has at least two first distribution valves, one first distribution valve is connected to one of the two secondary enclosures of the first elementary motor, a second first distribution valve is connected to the other of the two secondary enclosures of the first elementary motor, each first distribution valve being suitable for putting the secondary enclosure to which it is connected into communication with one or the other of the main ducts independently of the other first distribution valve.

5. A circuit according to claim 4, wherein the secondary enclosures of at least two of the other elementary motors are interconnected and suitable for being connected to the main ducts via a single common distribution valve.

6. A circuit according to claim 4, wherein said first distribution valves are incorporated into a casing of the first elementary motor.

7. A circuit according to claim 1, wherein said first and second elementary motors are sub-motors of the same motor, and are secured to a common outlet member.

8. A circuit according to claim 1, the first and second elementary motors drive respective ones of two distinct outlet members.

9. A circuit according to claim 1, wherein the first elementary motor has a cylinder capacity that is different from the cylinder capacity of another elementary motor.

10. A circuit according to claim 1, wherein each elementary motor has exactly said two secondary enclosures, one for feed and one for discharge.

11. A circuit according to claim 1, wherein the elementary motors are constant-velocity motors.

12. A circuit according to claim 1, wherein the fluid distributor has, for at least one elementary motor, inactivation means capable of deactivating said elementary motor by connecting said elementary motor in a continuous manner to the main duct having either a lower pressure or a higher pressure.

13. A circuit according to claim 12, wherein the elementary motors are sub-motors of the same motor, and the inactivation means are configured to detect the direction of rotation of the motor, said chosen pressure being selected as a function of the direction of rotation of the motor and of the direction of a speed command or of an acceleration command that is applied to the motor.

14. A circuit according to claim 1, further comprising a pump for exchanging feed and discharge fluid with said at least first and second elementary hydraulic motors through said at least two main ducts, wherein the control system is suitable for operating the valve means, in such a manner as to reverse the direction of rotation of an outlet member of the at least first and second elementary motors without reversing the direction of the flow of fluid driven by the pump.

15. A circuit according to claim 1, further comprising a pump for exchanging feed and discharge fluid with said at least first and second elementary hydraulic motors through said at least two main ducts, wherein the control system is suitable for operating the valve means in such a manner as to maintain the direction of rotation of an outlet member of the at least first and second elementary motors constant, during a reversal of input and output directions of the flow of fluid driven by the pump.

16. A circuit according to claim 1, wherein the valve means are also connected to the two secondary enclosures of at least one other elementary motor, said valve means being suitable for putting each of the secondary enclosures of said at least one other elementary motor into communication with either one or the other of the main ducts, independently of the other secondary enclosures.

17. A circuit according to claim 1, wherein:
at least one first elementary motor is coupled to a first movement member for moving a vehicle; and
at least one second elementary motor is coupled to a second movement member for moving a vehicle;
said control system of the first motor being suitable for causing the first motor to rotate, and thus for causing the first movement member to rotate, at a speed that is different from the speed of the second movement member or in a direction that is opposite from the direction of the second movement member.

18. A circuit according to claim 1, further including two pressure accumulators, and including at least four main ducts, the four main ducts comprising:
said at least two main ducts are two first main ducts being connected to said two pressure accumulators;
two second main ducts being connected to a pressurized fluid source other than said pressure accumulators;
wherein the valve means are suitable for connecting the secondary enclosures of the elementary motors of the first elementary motor to the first main ducts, and for connecting the secondary enclosures of the other elementary motors to the second main ducts.

19. A circuit according to claim 1, further including two pressure accumulators, and including at least four main ducts, the four main ducts comprising:
two first main ducts being connected to said two pressure accumulators;
said at least two main ducts are two second main ducts being connected to a pressurized fluid source other than said pressure accumulators;
wherein the valve means are suitable for connecting the secondary enclosures of the elementary motors of the first elementary motors to the first main ducts, and for connecting the secondary enclosures of the other elementary motors to the second main ducts.

20. A vehicle provided with a hydraulic transmission circuit according to claim 1, arranged so that
the at least first and second elementary hydraulic motors are associated for providing a common drive to the vehicle.

21. A hydraulic transmission circuit according to claim 1, wherein the control system includes an activation table that specifies and makes it possible to determine the operating modes of the elementary motors as a function of a desired cylinder capacity, each operating mode being chosen from among the drive operating mode, the opposing operating mode, and the inactive operating mode.

* * * * *